(12) United States Patent
Ash et al.

(10) Patent No.: US 6,431,744 B1
(45) Date of Patent: Aug. 13, 2002

(54) BLENDER HOPPER

(76) Inventors: Fred L. Ash; William O. Ash, Jr., both of 5300 Glenmont Dr., Houston, TX (US) 77081

( * ) Notice: Subject to any disclaimer, the term of this patent is extended or adjusted under 35 U.S.C. 154(b) by 0 days.

(21) Appl. No.: 09/715,771

(22) Filed: Nov. 17, 2000

Related U.S. Application Data (60) Provisional application No. 60/166,275, filed on Nov. 18, 1999.

(51) Int. Cl.[7] .................................................. B01F 7/02
(52) U.S. Cl. ........................ 366/205; 366/199; 366/314
(58) Field of Search ................................ 366/205, 314, 366/199, 197; D7/509, 523, 531, 527, 630, 378; 193/2 R; 241/199.12, 282.2

(56) References Cited

U.S. PATENT DOCUMENTS

| | | | |
|---|---|---|---|
| D123,477 S | * 11/1940 | Feltman et al. | |
| 2,315,018 A | * 3/1943 | Lawrence | 366/205 |
| D155,089 S | * 9/1949 | Karstadt | |
| D175,267 S | * 8/1955 | Moore | |
| 2,740,029 A | * 3/1956 | Kueser et al. | 366/205 |
| 2,794,627 A | * 6/1957 | Rodwick | 366/205 |
| 2,924,349 A | * 2/1960 | Huck | 366/205 |
| D187,684 S | * 4/1960 | Hauser | |
| 2,940,738 A | * 6/1960 | Posener et al. | 366/205 |
| D193,883 S | * 10/1962 | Clemente | |
| D198,303 S | * 5/1964 | Dewenter | |
| D246,561 S | * 12/1977 | Stahel | |
| 4,087,053 A | * 5/1978 | Voglesonger | 366/205 |
| D336,590 S | * 6/1993 | Barnard | |
| 5,380,086 A | * 1/1995 | Dickson | 366/314 |
| 5,487,511 A | * 1/1996 | Sansone et al. | 241/282.2 |

FOREIGN PATENT DOCUMENTS

| GB | 790872 | * 2/1958 | 366/205 |
|---|---|---|---|
| SU | 387727 | * 9/1973 | 366/205 |

* cited by examiner

*Primary Examiner*—Tony G. Soohoo
(74) *Attorney, Agent, or Firm*—Kenneth A. Roddy (57) ABSTRACT

A blender hopper has a contiguous annular side wall with a larger upper portion, and a smaller lower portion. The upper portion is in the form of a square and the lower portion is in the form of an octagon and a bottom wall adjoins the lower portion. Four narrower triangular side walls extend upwardly and outwardly from the diagonal sides of the bottom wall and adjoin the four corners of the upper portion, respectively, and four wider truncated wedge-shaped walls extend upwardly and outwardly from the four orthogonal sides of the bottom wall with their wider ends adjoining the four sides of the upper portion, respectively, and inwardly protruding longitudinal rib is formed in each of the wider truncated wedge-shaped walls. A tubular dispensing conduit is secured in an aperture in one of the wider walls and a dispensing valve is connected to its outer end. A cutter blade assembly mounted in the bottom wall crushes ice and in combination with the dual polygonal side wall configuration, thoroughly blends the liquid and ice to form the slush mixture and maintains its consistency.

14 Claims, 6 Drawing Sheets

BLENDER HOPPER

CROSS REFERENCE TO RELATED APPLICATION

This application claims priority of U.S. Provisional Application Ser. No. 60/166,275 filed Nov. 18, 1999.

BACKGROUND OF THE INVENTION

1. Field of the Invention

This invention relates generally to blenders and frozen beverage apparatus, and more particularly to a blender hopper or container with a side wall having an upper portion with a polygonal configuration and a lower portion with a different polygonal configuration, which is particularly suited for blending and maintaining the consistency of slush beverages.

2. Brief Description of the Prior Art

"Slush" beverages, as the term is used herein, are defined as a thick semi-frozen beverage having a semi-solid ice consistency, similar to partly melted snow, and consist of a mixture of flavored liquid or syrup, frozen crystals of the liquid or syrup, and other materials. Examples of slush beverages are frozen cocktails, such as a "frozen margarita" or "daiquiri", and flavored soft drinks or carbonated drinks, such as the popular beverages known commercially as an "icee" or a "slurpy" which are available at convenience stores and fast food chains.

Special machines have been provided for making carbonated slush beverages and frosted drinks consisting of a slush of ice crystals mixed with a flavoring ingredient such as a fruit-flavored syrup. There have also been attempts to use such machines for making slush cocktails such as margaritas, pina coladas, daiquiris and the like. These attempts have not been entirely successful, however, due to the relatively low capacity of the machines. The liquid to be frozen is generally delivered to the machine where it is frozen and held until it is dispensed. Such machines typically can hold only about one gallon of frozen product, and where a greater volume is required, e.g. in a large restaurant, a number of machines must be employed. These machines are relatively expensive, and although in at least one prior art installation the dispensing heads have been separated from the remainder of the machines, the machines are bulky and require a substantial amount of floor space.

Blenders are also used for making slush cocktails such as margaritas, pina coladas, daiquiris and the like. Usually, ice cubes or crushed ice are put into the along with an appropriate amount of the liquor for flavoring and potency and in some instances a fruit flavoring, i.e., lime, strawberry, banana, or the like. The blending together of these constituent materials would create the slush cocktail.

However, problems can occur resulting in inconsistency of taste of one drink mixture with respect to the next. Conventional blenders can cause cavitation which draws oxygen into the mixture, and can detract from the intended flavoring of the drink. Additionally, excess blending can induce heat energy into the drink, melt the ice cubes, and thus water down the drink reducing its preferred flavoring and minimizing the alcohol content per unit volume. Another problem with conventional blenders is that as soon as the blending stops, the liquid tends to separate from the ice particles, and settle to the bottom with the ice particles at the top of the container. And often the blender containing the mixture will sit for a period of time at room temperature before another drink is poured. This also results in a watered-down drink and diminished flavor and alcoholic potentency.

Also, because of its viscosity, the slush beverage mixture when prepared in a conventional blender will tend to merely spin around the central axis of the container, which results in insufficient blending and will render a drink having a different flavor, consistency, and alcoholic potency from the top of the container to the bottom.

Even in a large restaurant or bar where a greater volume is required, the blender used for these types of drinks only has a capacity of about one gallon of frozen product. The larger the blender container, the greater the risk of improper blending, and unsatisfactory consistency, flavor and alcoholic potency. Thus, a large number of machines must be employed, and more time spent in preparation of small batches.

Also, the conventional blender container is not suitable for storing and dispensing a slush beverage, because there is no provision for agitating the slush to maintain its consistency. If a metal container is used, portions of the mixture will freeze onto the side wall interior.

There are several patents which disclose various polygonal bowls and containers for kitchen blender and mixer appliances.

Landgraf, U.S. Pat. No. 2,284,155 discloses a food mixer having a bowl with a wall having a circular bottom portion and an upwardly diverging side wall preferably in the form of a hexagon with longitudinal baffles along the interior of the flat sides.

Kochner et al, U.S. Pat. No. 2,585,255 discloses a food mixer having a bowl with a wall having a circular bottom portion and an upwardly diverging side wall in the form of an octagon.

Malz et al, U.S. Pat. No. 2,758,623 discloses a liquifier having a bowl with a wall having a square bottom wall and an upwardly diverging side wall in the form of a square with longitudinal major and minor ribs along the interior of the flat sides.

Rebordosa, U.S. Pat. No. 5,639,034 discloses a working bowl for an electrically powered domestic kitchen appliance which includes with a wall having the form of a substantially regular polygon with at least five and preferably fifteen sides wherein food items are rapidly comminuted.

The present invention overcomes the disadvantages discussed above and is distinguished over the prior art in general and these patents in particular by a blender and blender hopper wherein the blender hopper has a contiguous annular side wall with a larger upper portion having a first polygonal configuration with a number of sides and a smaller lower portion having a second polygonal configuration with twice the number of sides of the upper portion. In a preferred embodiment the upper portion has four sides in the form of a square and the lower portion has eight sides in the form of an octagon and a bottom wall adjoining the lower portion. The size of the lower portion is about one-half the size of the upper portion, and the height of the hopper is about the same as the width of the open top portion, and has a capacity to hold about three gallons. Four narrower triangular side walls extend upwardly and outwardly from the diagonal sides of the bottom wall and adjoin the four corners of the upper portion, respectively, and four wider truncated wedge-shaped walls extend upwardly and outwardly from the four orthogonal sides of the bottom wall with their wider ends adjoining the four sides of the upper portion, respectively, and inwardly protruding longitudinal rib is formed in each of the wider truncated wedge-shaped walls. A tubular dispensing conduit is secured in an aperture in one of the wider walls and a dispensing valve is connected to its outer end. A cutter blade assembly mounted in the bottom wall crushes ice and in combination with the dual polygonal side wall configuration, thoroughly blends the liquid and ice to form the slush mixture and maintains its consistency.

SUMMARY OF THE INVENTION

It is therefore an object of the present invention to provide a new and improved blender and blender hopper apparatus and method for creating, blending, and dispensing slush beverages.

It is another object of the invention to provide a blender, blender hopper, and method, which is capable of producing slush beverages in substantially greater volume than the machines heretofore provided.

Another object of this invention is to provide a blended and blender hopper which consistently and accurately maintain a prescribed product slush thickness and flavor.

Another object of this invention is to provide a blender and blender hopper for slush beverages wherein a single unit crushes the ice, blends it with liquid ingredients, maintains the desired consistency, and also serves as the dispenser Another object of this invention is to provide a blender hopper that can be easily and quickly installed on a variety of commercially available blender bases.

A further object of this invention is to provide a blender hopper having a side wall configuration that will optimize the blending of slush material in the hopper.

A still further object of this invention is to provide a blender hopper which is simple in construction, and rugged and reliable in operation.

Other objects of the invention will become apparent from time to time throughout the specification and claims as hereinafter related.

The above noted objects and other objects of the invention are accomplished by a blender hopper having a contiguous annular side wall with a larger upper portion having a first polygonal configuration with a number of sides and a smaller lower portion having a second polygonal configuration with twice the number of sides of the upper portion. In a preferred embodiment the upper portion has four sides in the form of a square and the lower portion has eight sides in the form of an octagon and a bottom wall adjoining the lower portion. The size of the lower portion is about one-half the size of the upper portion, and the height of the hopper is about the same as the width of the open top portion, and has a capacity to hold about three gallons. Four narrower triangular side walls extend upwardly and outwardly from the diagonal sides of the bottom wall and adjoin the four corners of the upper portion, respectively, and four wider truncated wedge-shaped walls extend upwardly and outwardly from the four orthogonal sides of the bottom wall with their wider ends adjoining the four sides of the upper portion, respectively, and inwardly protruding longitudinal rib is formed in each of the wider truncated wedge-shaped walls. A tubular dispensing conduit is secured in an aperture in one of the wider walls and a dispensing valve is connected to its outer end. A cutter blade assembly mounted in the bottom wall crushes ice and in combination with the dual polygonal side wall configuration, thoroughly blends the liquid and ice to form the slush mixture and maintains its consistency.

DESCRIPTION OF THE PREFERRED EMBODIMENT

Figure 1:
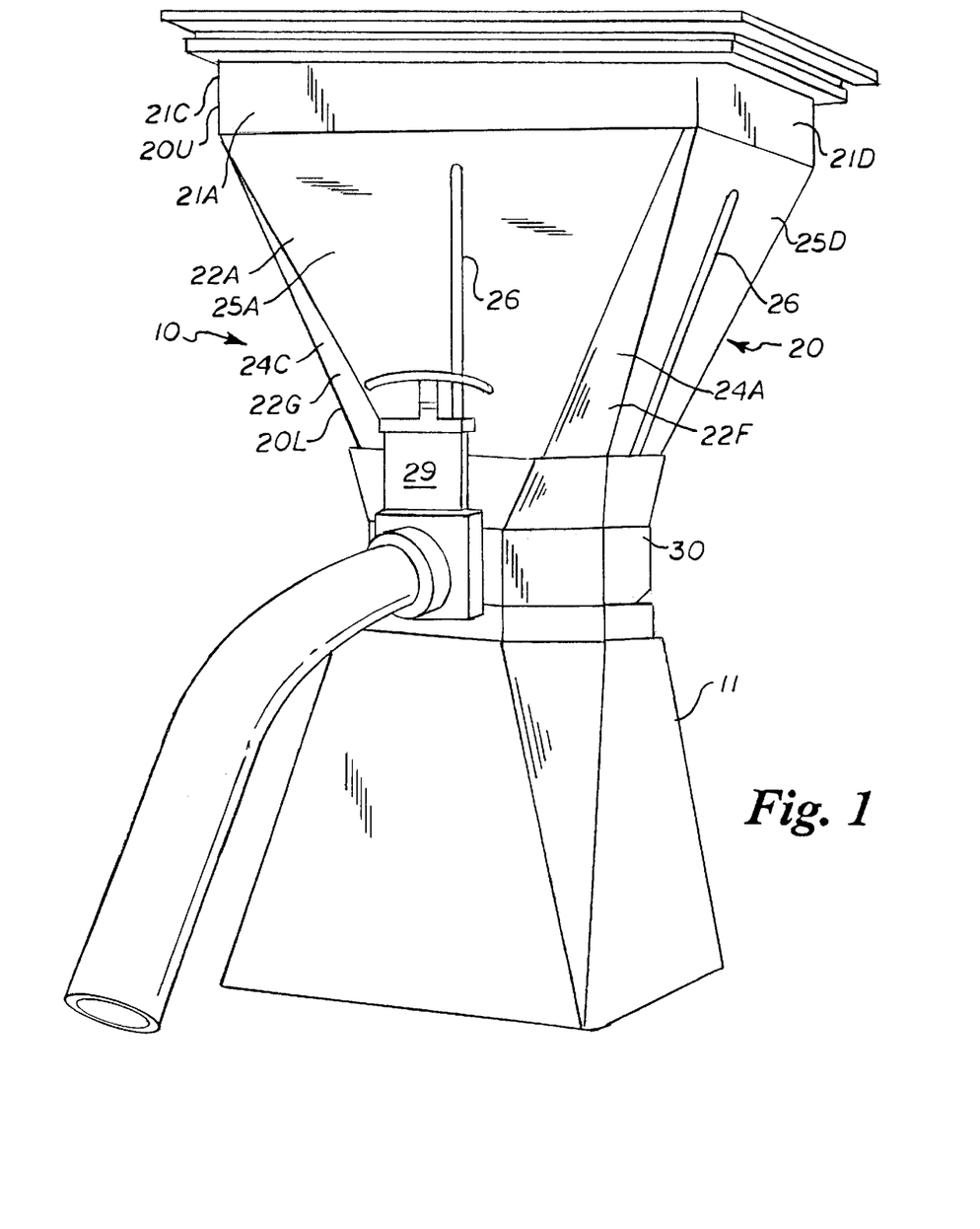
FIG. 1 is a perspective view of the blender assembly and blender hopper in accordance with the present invention.

Referring to the drawings by numerals of reference, there is shown in FIG. 1, a blender assembly 10 embodying a blender hopper 20 in accordance with the present invention. As described hereinafter, the bottom of the blender hopper 20 is configured to be mounted and supported on a conventional blender base 11 having a motor with an upwardly facing drive coupling. In FIG. 1, the blender hopper 20 is shown with an adapter 40 having an upstanding side wall (described hereinafter), which may also be attached to the bottom of the blender hopper to it to fit various commercially available blender bases.

The blender container or hopper 20 is preferably formed of a transparent or translucent plastic material. Referring additionally to FIGS. 2–5, the hopper 20 includes a contiguous annular side wall surrounding a central longitudinal axis with an upper portion 20U having a first polygonal configuration with a number of sides and a lower portion 20L having a second polygonal configuration with twice the number of sides of the upper portion. For example, in the illustrated embodiment, the upper portion 20U of the side wall has four sides 21A, 21B, 21C, 21D in the form of a square and the lower portion 20L has eight sides 22A–22H in the form of an octagon. The sides at the top of the square upper portion 20U are of a length (horizontal direction) such that lines drawn from its corners to the longitudinal axis of the hopper enclose an angle A of 90°. The sides at the bottom of the polygonal lower portion 20L are of a length (horizontal direction) such that lines drawn from its corners to the longitudinal axis or center of the hopper or container enclose an angle B of 45°. The hopper 20 has a bottom wall 23 with a polygonal periphery adjoining the lower portion 20L having the same number of sides as the polygonal lower portion, for example eight sides in the illustrated embodiment.

The polygonal upper portion 20U is larger than the polygonal lower portion 20L. That is to say, the inner sides of the polygonal upper portion 20U are tangent to a circle having a first diameter and the inner sides of the polygonal lower portion 20L are tangent to a circle having a diameter smaller than the diameter of the first circle. In a preferred embodiment, the inner sides of the polygonal upper portion 20U are tangent to a circle having a first diameter and the inner sides of the polygonal lower portion 20L are tangent to a circle having a diameter approximately one-half the diameter of the first circle. For example, the first circle may have a diameter of 12½" and the diameter of the second circle would thus be 6¼".

The height of the hopper 20 is approximately the same as the width of the open top portion 20U, and its interior is sized to hold approximately three gallons.

The corners CL of each of the diagonal sides 22E–22H of the polygonal lower portion extend angularly upward and outward from the bottom wall 23 and converge in a smooth transition into a respective one of the corners CU of the polygonal upper portion 20U. In the illustrated embodiment, the transition from eight corners to four corners produces a combination of four relatively narrower triangular side walls 24A, 24B, 24C, 24D that extend upwardly and outwardly from the four diagonal sides 22E–22H of the bottom wall with the apex of the triangular shape facing upwardly adjoining each of the four corners CU of the upper portion, respectively, and four wider truncated wedge-shaped walls 25A, 25B, 25C, 25D that extend upwardly and outwardly from the four orthogonal sides of the bottom wall 23 with their wider ends facing upwardly adjoining each of the four sides 21A–21D of the upper portion, respectively. An inwardly protruding longitudinal rib 26 is formed in each of the wider truncated wedge-shaped walls 25a–25D along its center.

One of the wider truncated wedge-shaped walls 25A is provided with an aperture 27 at its bottom end and one end of a tubular dispensing conduit 28 is secured in the aperture. A dispensing valve 29 (shown in FIG. 1) is connected to the outer end of the conduit 28. The conduit 28 and a portion of the bottom wall 23 may be angled downwardly to facilitate flow of the contents out of the hopper.

Figure 3:
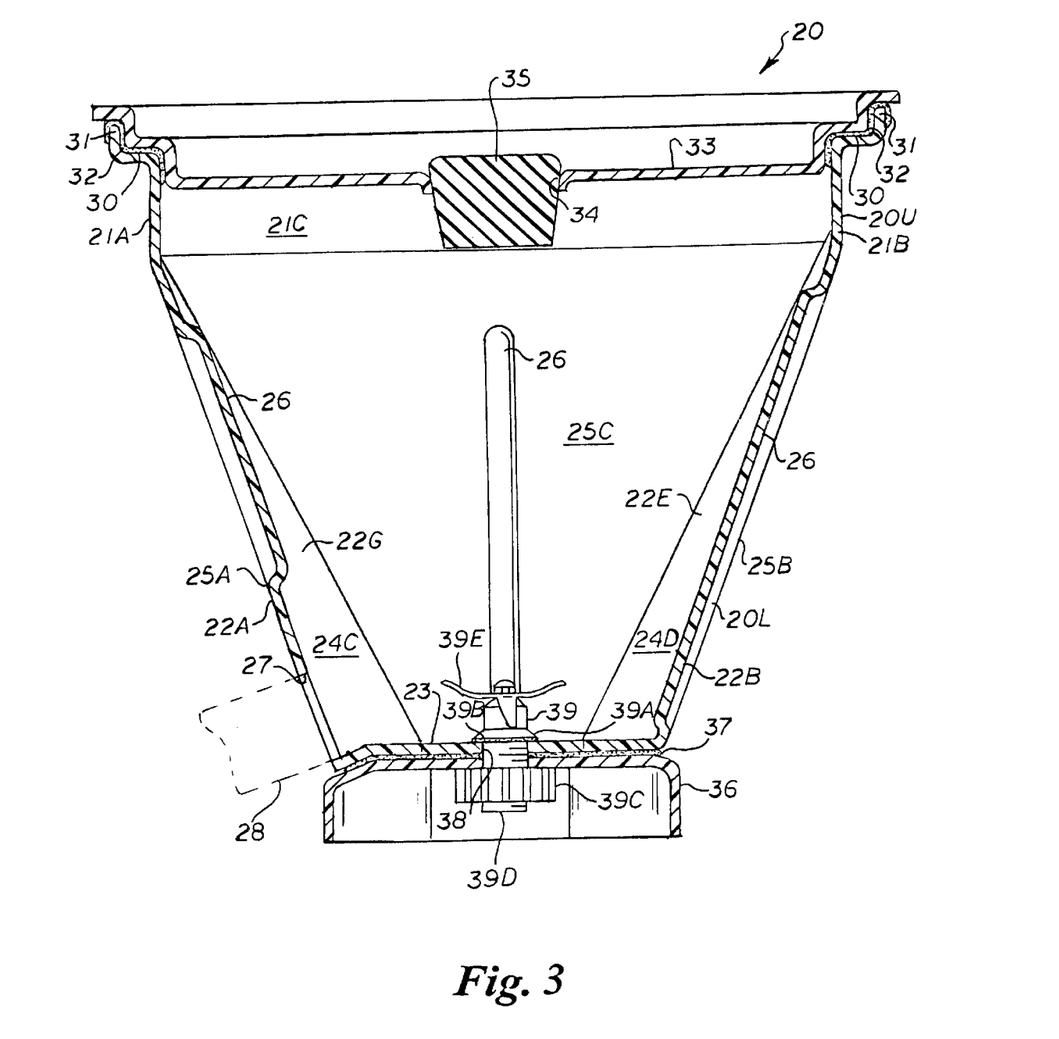
FIG. 3 is a longitudinal cross section of the blender hopper.
Figure 4:
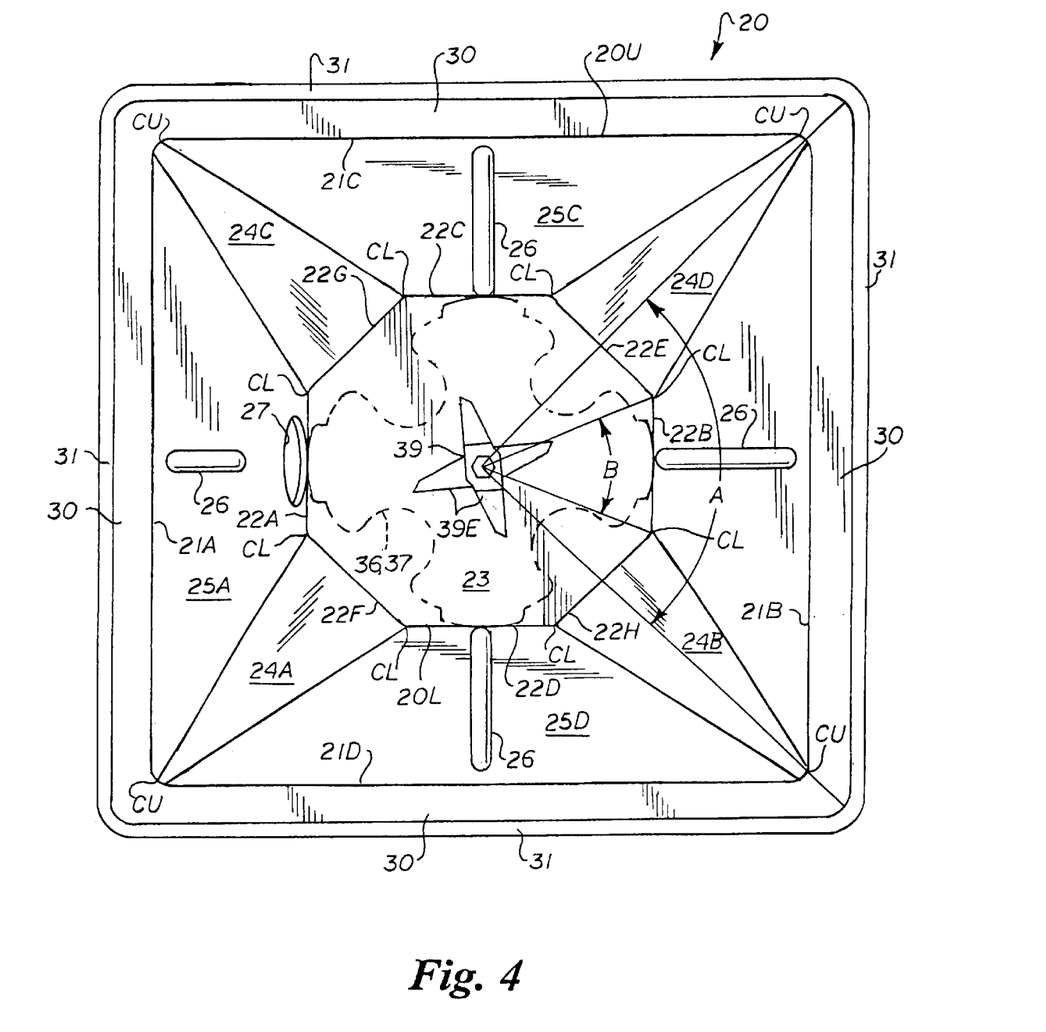
FIG. 4 is a top plan view of the blender hopper with the lid removed.

As best seen in FIGS. 3 and 4, the top end of the upper portion 20U of the blender hopper 20 has a flat horizontal ledge 30 extending outwardly from the side walls terminating in a peripheral vertical side wall 31. An elastomeric gasket or seal 32 is received on the horizontal ledge 30 and peripheral wall 31 and has a depending vertical portion that extends downwardly from the ledge 30.

A polygonal lid 33 is received on the top end of the hopper 20. The lid 33 has an upstanding peripheral side wall with a profile configured to engage the gasket or seal 32 in sealing relation when pressed thereon. The hopper 20 may also be provided with latches or clamps (not shown) for securely clamping the lid to the hopper. The lid 33 may also be provided with a central aperture or hole 34 for adding ice or other ingredients, and a removable elastomeric stopper 35 for sealing the hole 34. The stopper 35 may be removed during the blending process to add ingredients if desired or necessary.

Figure 2:
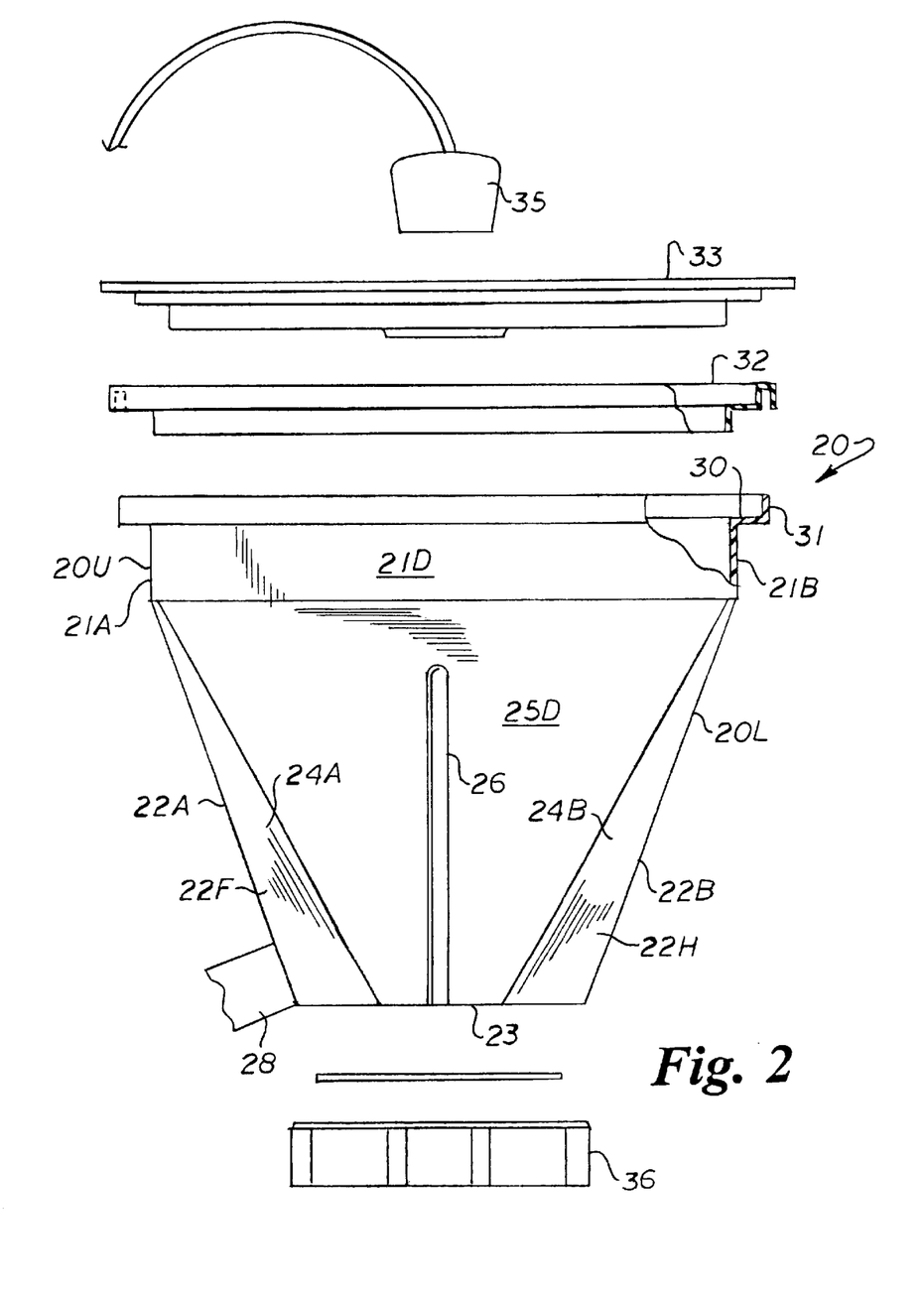
FIG. 2 is an exploded side elevation of the blender hopper.
Figure 5:
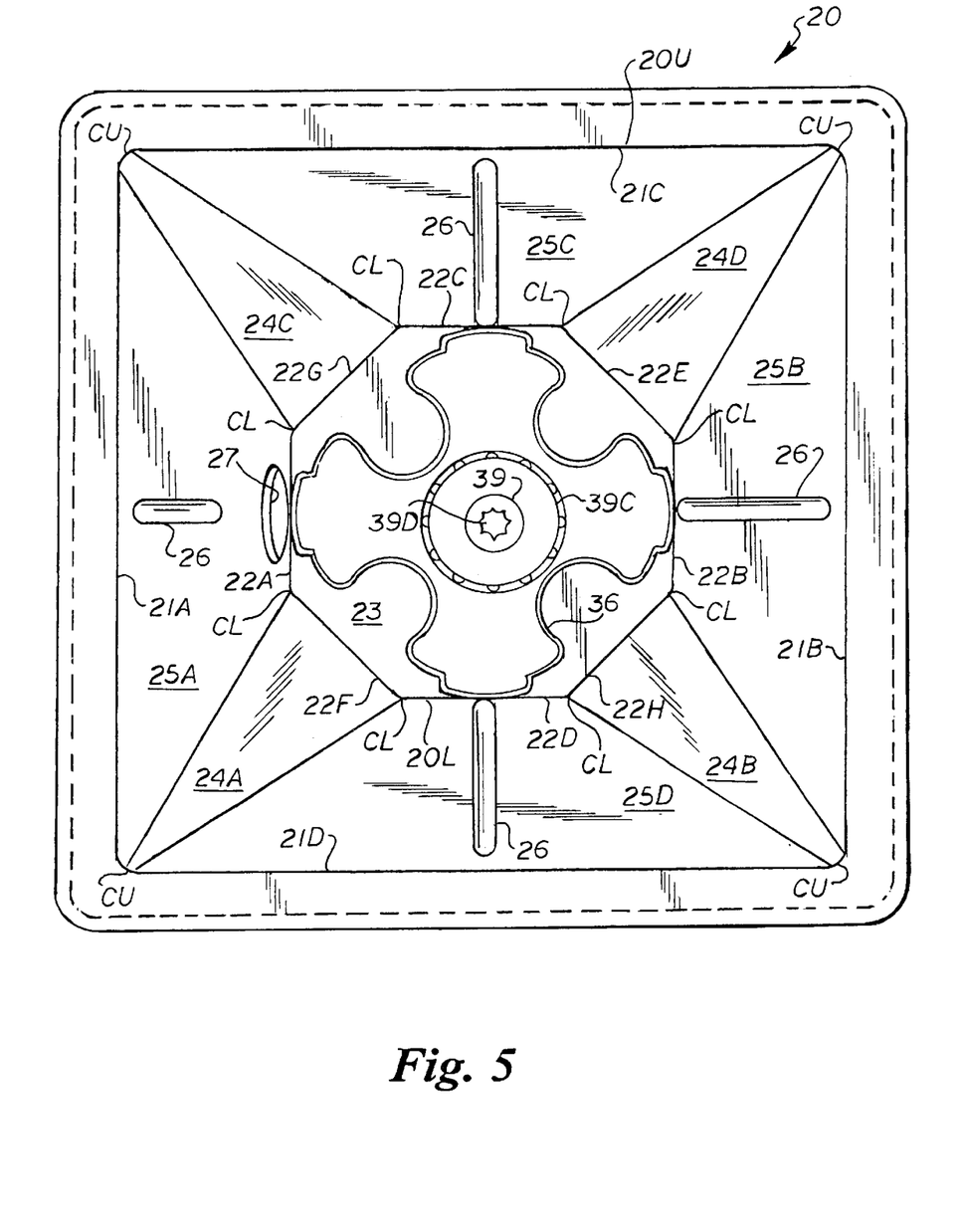
FIG. 5 is a bottom plan view of the blender hopper.

As best seen in FIGS. 2, 3, and 5, an adapter 36 is secured to the underside of the bottom wall 23 of the hopper 20 and an elastomeric gasket 37 is disposed therebetween. The bottom wall 23, adapter 36, and gasket 37 are each provided with a central aperture 38 through which a conventional cutter blade assembly 39 is mounted. The cutter blade assembly 39 has an upper flange 39A that is engaged on a seal 39B surrounding the aperture 38 on the top surface of the bottom wall 23. The body of the cutter assembly 39 extends a distance beneath the aperture and is provided with external threads. A nut 39C is threadedly engaged on the exterior of the cutter blade assembly 39 and tightened to secure the adapter 36 to the bottom of the hopper and compress the seal 39B and gasket 37 to seal the cutter blade assembly in the bottom of the hopper.

The cutter blade assembly 39 has a central drive socket 39D which is received on the upstanding shaft of the motor in the blender base 11. The adapter 36 has a peripheral side wall which is contoured to mate with the mounting arrangement at the top the blender base 11. In the embodiment shown in FIGS. 2, 3, and 5, the periphery of the adapter 36 is contoured to receive and engage the upstanding elastomeric mounting bosses of a commercially available blender base.

Figure 6:
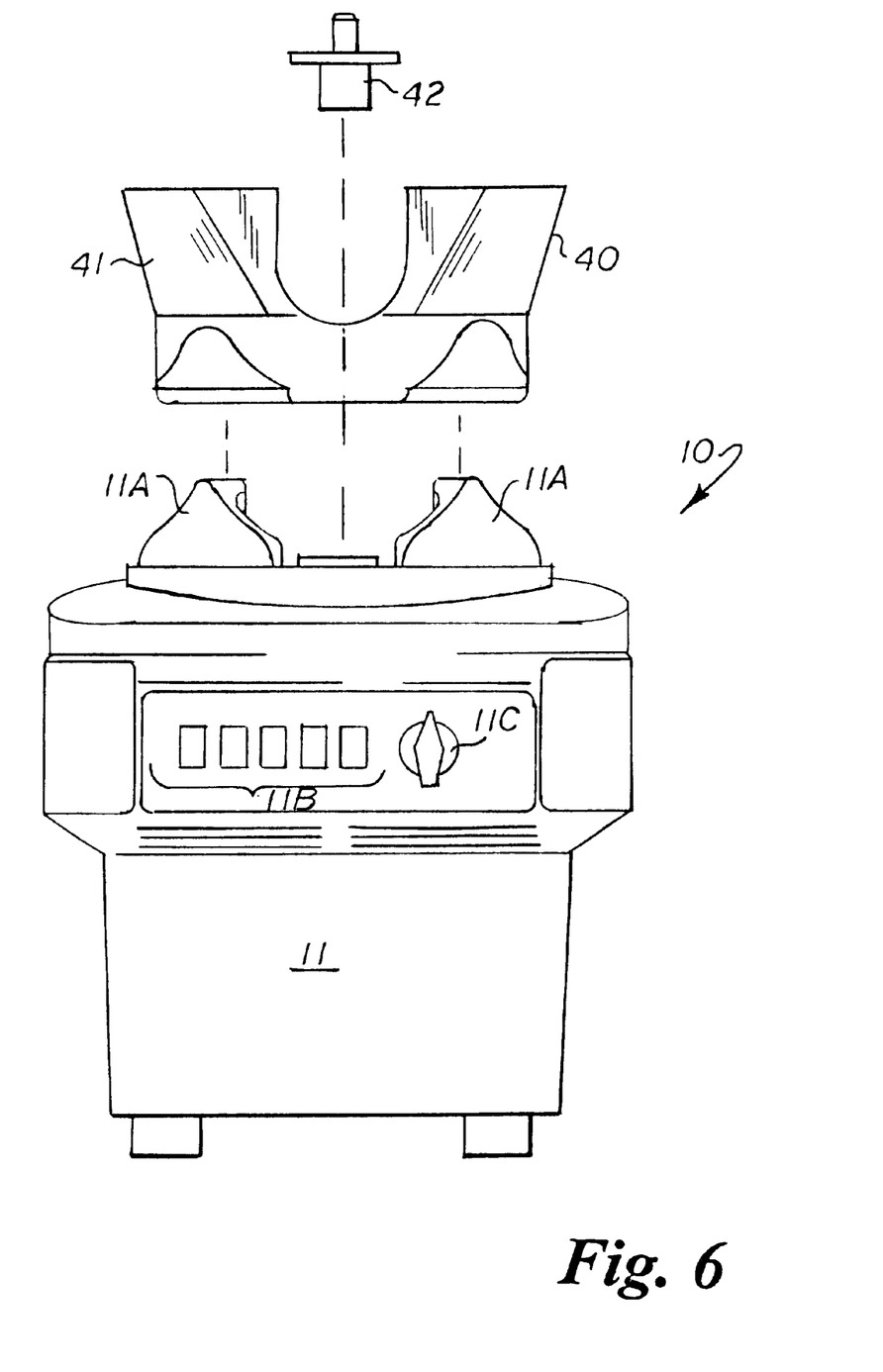
FIG. 6 is an exploded side elevation of another adapter which may be used with the blender hopper.

FIG. 6 shows another adapter 40 which may be used with the blender hopper. The adapter 40 may be placed over the adapter described above and is also contoured to receive and engage the upstanding elastomeric mounting bosses 11A of a commercially available blender 11. However, in this modification, the adapter 40 has an upstanding polygonal side wall 41 which is configured to engage and surround the polygonal lower portion 20L of the hopper 20. The upstanding side wall 41 of the adapter 40 provides additional lateral support for the hopper. Additional drive socket adapters 42 may also be provided to adapt the drive socket 39D of the cutter blade assembly 39 in the hopper to fit various sizes and shapes of the drive shafts of different blender bases. The blender base 11 is provided with controls 11B for controlling the operation and speed of the motor, and may also be provided with a timer 11C.

The cutter blade assembly 39 is adapted to rotate about the center of the hopper. The preferred cutter blade assembly 39 is a commercially available cutter blade assembly of the type suitable for chopping or crushing ice and blending. In the illustrated embodiment, the cutter blade assembly 39 has four diametrically opposed blades 39E, with two opposed blades projecting upwardly and the other two opposed blades projecting downwardly.

In operation, a given quantity of ice cubes is placed into the hopper, the prescribed liquid mixture is poured into the hopper and the motor is turned on. As the blades rotate, their outer ends describe an imaginary circle of rotation extending at a small and constant distance relative to the inner wall of the polygonal lower portion of the hopper. The blades chop the ice cubes into small particles and thoroughly blend them with the liquid ingredients to form a slush-like consistency. The slush is picked up by the blades of the cutter and the centrifugal force causes a large portion of the slush to engage and move along the polygonal side walls of the hopper in a circumferential direction wherein it is alternately urged against the orthogonal surfaces and diagonal surface. As the slush moves against these surfaces circumferentially a portion will be deflected inwardly toward the bite of the cutter blades by the longitudinal ribs, facilitated by the inwardly and downwardly angled wall surfaces, and another portion will be caused to move upwardly along the upwardly and outwardly angled wall surfaces and fall back down. This induces secondary counter flow in the form of back flows, eddies, etc.

The portion of the slush being fed back to the cutter blades is again picked up by the blades and the process is repeated as long as the blades are rotating. After the ice is crushed and thoroughly blended with the liquid ingredients to form the slush-like consistency, the blades may be rotated at a slower speed to maintain the slush-like consistency and to prevent the formation of clumps of ice. Rotation of the blades also prevents the liquid from separating from the ice particles.

As the slush is moved circumferentially it is met by a sequence of orthogonal and diagonal surfaces and inwardly protruding ribs. Because of the many faceted surfaces and the tortuous flow path, conditions of high shear are produced which are especially effective in the crushing of the ice cubes, blending and mixing of the ingredients, and preventing separation of the ice and liquid.

Tests have shown that a blender hopper constructed in accordance with the present invention will produce approximately three gallons of a slush beverage in about one minute, and the dispensed beverage will be of the desired prescribed consistency and flavor and will not become watered down.

While this invention has been described fully and completely with special emphasis upon a preferred embodiment, it should be understood that within the scope of the appended claims the invention may be practiced otherwise than as specifically described herein.

What is claimed is:

1. A blender hopper for an electrically powered blender appliance, the blender hopper having a longitudinal axis and comprising:

a horizontal bottom wall disposed in a plane transverse to the longitudinal axis having four diametrically opposed orthogonal sides and four diagonal sides;

a contiguous annular side wall extending upwardly from said bottom wall having a larger upper portion with a cross section generally in the form of a square with four diametrically opposed flat sides and diagonal corners defining an open top end and a smaller lower portion with a cross section generally in the form of an octagon with four diametrically opposed orthogonal sides and four diagonal sides;

each of said diagonal sides of said octagon extending angularly upward and outward from said bottom wall and converging in a smooth transition into a respective one of said diagonal corners of said square to form a combination of four relatively narrower triangular side walls extending upwardly and outwardly from four diagonal sides of said bottom wall each with an upwardly facing apex adjoining a respective one of said diagonal corners of said square, and four wider truncated wedge-shaped walls extending upwardly and outwardly from said orthogonal sides of said octagon with upward facing wider ends adjoining each of said diametrically opposed sides of said square, respectively.

2. The blender hopper according to claim 1, wherein said diametrically opposed flat sides of said larger upper portion have generally flat inner surfaces tangent to a first circle having a first diameter; and said orthogonal sides and diagonal sides of said smaller lower portion have generally flat inner surfaces tangent to a second circle having a diameter approximately one-half the diameter of said first circle.

3. The blender hopper according to claim 2, wherein said first circle has a diameter of approximately 12½ inches and said second circle has a diameter of approximately 6¼ inches.

4. The blender hopper according to claim 1, wherein said annular side wall has a height in vertical dimension approximately equal to the diametric distance between said diametrically opposed flat sides of said upper portion.

5. The blender hopper according to claim 1, wherein said bottom wall and said contiguous annular side wall are sized to form a container having an interior capable of containing a volume of approximately three gallons.

6. The blender hopper according to claim 1, further comprising:

an elongate inwardly protruding rib extending along the center of each of said wider truncated wedge-shaped walls.

7. The blender hopper according to claim 1, further comprising:

discharge means connected at a lower end of said lower portion in fluid communication with the interior of said hopper for dispensing the contents therefrom.

8. The blender hopper according to claim 1, further comprising:

a removable lid having a polygonal periphery adapted to be sealingly engaged on said larger upper portion.

9. The blender hopper according to claim 8, further comprising:

a central aperture in said lid through which materials may be passed into the interior of said hopper; and a removable stopper adapted to be sealingly engaged in said aperture.

10. The blender hopper according to claim 1, further comprising:

impeller means mounted on said bottom wall having blades that rotate within said hopper about the longitudinal axis and drive means connected therewith exterior of said bottom wall adapted to be received and rotatably driven by a drive shaft of a motor disposed in an electrical blender appliance base.

11. The blender hopper according to claim 1, further comprising:

a generally cup-shaped adapter having a first end configured to be engaged with said bottom wall and a second end configured to be engaged on a mounting surface of an electrical blender appliance base.

12. The blender hopper according to claim 11, further comprising:

impeller means mounted on said bottom wall having blades that rotate within said hopper about the longitudinal axis and drive means connected therewith exterior of said bottom wall; and a drive socket extension having a first end adapted to be engaged with said impeller drive means and a second end adapted to be received and rotatably driven by a drive shaft of a motor disposed in an electrical blender appliance base.

13. An electrically powered blender appliance, comprising:

a base unit having a mounting surface at a top end and containing an electric motor with an upwardly extending drive shaft;

a blender hopper having a longitudinal axis and a horizontal bottom wall disposed in a plane transverse to the longitudinal axis configured to be removably engaged with said mounting surface; and impeller means mounted on said bottom wall having blades that rotate within said hopper about the longitudinal axis and drive means connected therewith exterior of said bottom wall adapted to be received and rotatably driven by said drive shaft;

said blender hopper having a contiguous annular side wall extending upwardly from said bottom wall having a larger upper portion with a cross section generally in the form of a square with four diametrically opposed flat sides and diagonal corners defining an open top end and a smaller lower portion with a cross section generally in the form of an octagon with four diametrically opposed orthogonal sides and four diagonal sides;

each of said diagonal sides of said octagon extending angularly upward and outward from said bottom wall and converging in a smooth transition into a respective one of said diagonal corners of said square to form a combination of four relatively narrower triangular side walls extending upwardly and outwardly from four diagonal sides of said bottom wall each with an upwardly facing apex adjoining a respective one of said diagonal corners of said square, and four wider truncated wedge-shaped walls extending upwardly and outwardly from said orthogonal sides of said octagon with upward facing wider ends adjoining each of said diametrically opposed sides of said square, respectively.

14. The blender appliance according to claim 13, further comprising:

an elongate inwardly protruding rib extending along the center of each of said wider truncated wedge-shaped walls.

* * * * *